United States Patent
DeGolier

(10) Patent No.: US 9,188,496 B2
(45) Date of Patent: Nov. 17, 2015

(54) REAL-TIME CALCULATION OF TOTAL LONGITUDINAL FORCE AND AERODYNAMIC DRAG ACTING ON A RIDER ON A VEHICLE

(76) Inventor: Eric DeGolier, Haywards Heath (GB)

( * ) Notice: Subject to any disclaimer, the term of this patent is extended or adjusted under 35 U.S.C. 154(b) by 243 days.

(21) Appl. No.: 13/695,990

(22) PCT Filed: May 5, 2011

(86) PCT No.: PCT/GB2011/000698
§ 371 (c)(1),
(2), (4) Date: Nov. 6, 2012

(87) PCT Pub. No.: WO2011/138590
PCT Pub. Date: Nov. 10, 2011

(65) Prior Publication Data
US 2013/0054143 A1    Feb. 28, 2013

(30) Foreign Application Priority Data
May 5, 2010 (GB) .................................. 1007466.4

(51) Int. Cl.
G01M 9/06 (2006.01)
G01L 1/24 (2006.01)
G01L 5/13 (2006.01)

(52) U.S. Cl.
CPC . *G01L 1/247* (2013.01); *G01L 5/13* (2013.01); *G01M 9/06* (2013.01)

(58) Field of Classification Search
CPC ...................................................... G01M 9/06
USPC ....................................................... 702/50, 3
See application file for complete search history.

(56) References Cited

U.S. PATENT DOCUMENTS

| 7,377,180 B2 | 5/2008 | Cunningham | |
| 7,599,806 B2 * | 10/2009 | Hauschildt | 702/44 |
| 2007/0068273 A1 | 3/2007 | Cunningham | |
| 2007/0186669 A1 * | 8/2007 | Cunningham | 73/781 |
| 2008/0257068 A1 | 10/2008 | Muller et al. | |

FOREIGN PATENT DOCUMENTS

| DE | 3224941 C1 | 1/1984 |
| DE | 3612599 A | 10/1987 |
| DE | 10242447 A1 | 3/2004 |
| EP | 0315497 A | 5/1989 |
| FR | 2580395 A1 | 10/1986 |

(Continued)

OTHER PUBLICATIONS

Funke et al., "Rider/Motorcycle Interaction—a Human Appraoce to Motorcycle Safety", Mar. 2001, Intl. Motorcycle Safety Conf.; http://www.msf-usa.org/downloads/imsc2001/2001IMSC.pdf.*

(Continued)

*Primary Examiner* — Regis Betsch
(74) *Attorney, Agent, or Firm* — Mollborn Patents, Inc.; Fredrik Mollborn

(57) ABSTRACT

A system and method of calculating under changing conditions in real-time aerodynamic drag acting on a rider on a vehicle. A computer receives a signal indicative of a force of the vehicle on the rider from at least one force sensor located at or near at least one point of contact between the rider and the vehicle. The computer determines aerodynamic drag acting on the rider on the vehicle from the received signal. These steps are repeated under changing conditions.

24 Claims, 5 Drawing Sheets

(56) References Cited

FOREIGN PATENT DOCUMENTS

| JP | 6201713 A | 7/1994 |
|---|---|---|
| JP | 2009179264 A | 8/2009 |
| NL | 1010278 C1 | 4/2000 |
| RU | 2129260 C1 | 4/1999 |
| WO | 2010000369 A1 | 1/2010 |

OTHER PUBLICATIONS

Bolourchi et al., "Measurement of Rider Induced Loads During Simulated Bicycling", 1985, 3rd Intl Symposiom of Biomech. in Sports, pp. 178-198; https://ojs.ub.uni-konstanz.de/cpa/article/view/1446.* de Groot et al., "Air friction and rolling resistance during cycling", 1995, Medicine and Science in Sports and Exercise 1995, pp. 1090-1095.*

Ingrid Marie Vincent Andersen, "Wind loads on post-panamax container ship", 2013, Ocean Engineering 58 (2013) 115-134.*

Grappe F. et al.: "Aerodynamic drag in field cycling with special reference to the Obree's position", Ergonomics, vol. 40, No. 12, Dec. 31, 1997, pp. 1299-1311.

International Search Report. International application No. PCT/GB2011/000698. Date of the actual completion of the international search: Aug. 8, 2011.

Soden, P D et al: "Forces applied to a bicycle during normal cycling". Journal of Biomechanics UK, vol. 12, No. 7, 1979, pp. 527-541. ISSN: 0021-9290.

UK Patent Search Report. Intellectual Property Office. Patents Act 1977: Search Report under Section 17. Application No. GB1007466.4. Date of Search: Sep. 8, 2010.

Fintelman D. M. et al., "The Effect of Crosswinds on Cyclists: an Experimental Study", Procedia Engineering 72 (2014), pp. 720-725, Science Direct.

Godo et al., "A Comparative Aerodynamic Study of Commercial Bicycle Wheels using CFD.", AIAA Paper 2010-1431 (2010).

* cited by examiner

REAL-TIME CALCULATION OF TOTAL LONGITUDINAL FORCE AND AERODYNAMIC DRAG ACTING ON A RIDER ON A VEHICLE

FIELD OF THE INVENTION

The Invention generally relates to the calculation under changing conditions in real-time of aerodynamic drag acting on a rider on a vehicle.

DESCRIPTION OF RELATED ART

As to reduce the complexity and length of the Detailed Specification, and to fully establish the state of the art in certain areas of technology, Applicant herein expressly incorporates by reference all of the following materials identified below:

DE3612599—Method for determining the aerodynamic forces acting on a vehicle;

US20080257068 (A1)—Wheel, test stand and method for determining aerodynamic characteristics of a test vehicle;

U.S. Pat. No. 7,377,180 (B2)—Method for measuring total force in opposition to a moving vehicle;

RU2129260—Method and device determining force of air head resistance to vehicle;

JP6201713—Wind speed measuring device;

NL1010278—Wind resistance meter for bicycle is mounted on handlebars and uses hinged wind vane linked to spirit level;

EP0315497 (A1)—Device for measuring the resulting aerodynamic force acting on a vehicle DE3224941—Device for measuring the air resistance of vehicles; and U.S. Pat. No. 7,599,806 (B2)—Portable power meter for calculating power applied to a pedal and crank arm based drive mechanism and a method of calculating the power Drag is the friction of fluid moving past a body. Aerodynamic drag is the result of a body moving through air. Vehicles that expose a rider to aerodynamic drag forces are unique in that the rider's body is not static during travel, meaning that testing in a wind tunnel only indicates the total drag and drag coefficient of the system at that moment. Examples of these vehicles include, but are not limited to, a bicycle, luge, skeleton, ski, snowboard, convertibles, and open-cockpit aircraft. At the higher levels of sport such as cycling it is common for athletes to refine their position in a wind tunnel in an effort to minimize drag losses. Measuring in a wind tunnel is often adequate for a car, as it is made of rigid parts and so always retains the same shape. For vehicles with an exposed rider, the effectiveness of this method is limited because of the dynamic nature of a person's posture. Body position can change from day to day, with changes in clothing, equipment, fatigue, or even morphological changes to the body itself.

NL1010278 teaches a wind resistance meter for a bicycle which is mounted on handlebars and uses hinged wind vane linked to spirit level. Similarly EP0315497 (A1) reveals a device for measuring the aerodynamic force acting on a vehicle. EP0315497 and NL1010278 both introduce ways of continuously measuring wind pressure on the front of the vehicle but do not attempt to calculate drag force from this measurement.

Calculation of bicycle aerodynamic drag force without use of a wind tunnel has been attempted. U.S. Pat. No. 7,377,180 describes taking measurements of wind speed, temperature, barometric pressure, and road slope with assumed, calibrated, or manually entered values for frontal area, drag coefficient, frictional losses, and vehicle weight to calculate total forces, which include aerodynamic forces, acting on a vehicle. However, forces are not directly measured and the teaching of this document does not address the problem of a body that can change shape during travel, as it assumes a constant frontal area and constant drag coefficient. Furthermore, it assumes a constant rolling resistance, which is not the case in real-world conditions.

It is an object of the present invention to address the drawbacks mentioned above.

SUMMARY OF THE INVENTION

Embodiments of the present invention provide among other things systems and methods of measuring a total longitudinal force on a rider on a vehicle, calculating aerodynamic drag force on the rider, and calculating the product of aerodynamic drag coefficient and the frontal area of the rides body.

According to a first aspect of the present invention, there is provided methods as defined in claims 1 and 22. There is also provided a computer program comprising computer program code means adapted to perform the method. The computer program may be embodied on a computer readable storage medium.

According to a second aspect of the present invention, there is provided a system as defined in claim 25. There is also provided a vehicle comprising such a system. There is also provided a bicycle comprising such a system.

Further aspects of the present invention are defined in the dependent claims.

It is advantageous to provide real-time aerodynamic drag monitoring in activities where the body is exposed to wind forces. In embodiments, a total longitudinal force (in the direction the rider-vehicle system is traveling) acting on a rider on a vehicle under changing conditions is calculated and displayed repeatedly in real-time. The changing conditions may comprise the frontal area of the rider, or the road condition the vehicle is traveling, etc. Calculating the longitudinal force may be achieved measuring the flux of forces from the rider to a portion (majority) of the vehicle through a system of contact points by using at least one sensor disposed between each rider-vehicle interface. To display the longitudinal force, the data may be transmitted to the visual display through wires or wireless signals and displayed in any form applicable. The way the data may be displayed comprises graphical, numerical, or any applicable forms.

In embodiments, the longitudinal force acting on the rider on the vehicle is calculated and the measured/calculated value of any physical variables or the predetermined time interval are stored to a computer readable medium. These embodiments may be achieved by storing the data to any device readable by the computer through any way to transfer the data. For example, the data may be stored to a memory chip, an external hard drive, a hot-pluggable USB device, or a remote storing device, like a hard drive in a laptop which receives the data through wireless signals.

In embodiments of the invention the calculated longitudinal force acting on the rider on the vehicle is displayed on a visual display mounted on the rider or the vehicle. These embodiments may be achieved by using any suitable device that can receive and display the data. For example, a wrist watch compatible with this invention, or a cyclocomputer mounted on the handlebars of a bicycle.

In embodiments of the invention the longitudinal force acting on the rider on the vehicle is calculated, where the vehicle can be, but is not limited to, a bicycle, skis, a luge, skates, a skeleton, or a motorcycle, etc—any vehicle that is powered by stored chemical, mechanical, or electrical energy, human propulsion, or gravity.

In embodiments of the invention a computer in real-time calculates and causes to display an aerodynamic drag acting against a rider on a vehicle. The process is repeated every predetermined interval—for example, every 0.5 seconds. These embodiments may be achieved by determining the total longitudinal force from signals of at least one force sensor at or near each or most of the contact points between the rider and the vehicle, and isolating the aerodynamic drag by subtracting any other force(s) measured or calculated from signals of at least one auxiliary sensor on the rider or any other place on the vehicle. To reflect the changes repeatedly in real-time, a timer is used to signal to the computer at a predefined interval of time so that the computer can retrieve the current measurements from the sensors and re-calculate the aerodynamic drag. A visual display is used to show the data measured or calculated. The visual display may show the data in any applicable forms, and the data may be transmitted to the display through wires or wireless protocols. The visual display may be mounted on the rider or vehicle as described above.

In embodiments of the invention aerodynamic drag acting against a rider on a bicycle with a saddle seat, a handle bar, and a pedal crank arm is repeatedly calculated under changing conditions in real-time. These embodiments may be achieved by using at least one force sensor installed at or near the contact points on the handlebar and the seat; and at least one auxiliary sensor located on the rider or the bicycle. The total aerodynamic force is calculated by summing the forces measured or calculated from the handlebars, the seat, and the pedals and subtracting other remaining force(s) if there is any. The fluxes of forces from the rider to the bicycle are measured by the force sensors, for example strain gauges, placed at or near contact points on the handlebar and the seat. The pedal forces may be calculated using the measurements from the force sensors and the auxiliary sensor and/or other user-inputted constant physical parameter(s). In one embodiment, the pedal forces are calculated using the crank position and the rider's weight. The calculated aerodynamic force can be displayed on a visual display which, for example, may be mounted on the rider or the vehicle.

In embodiments of the invention any data measured or calculated is stored to a computer readable medium. The data may be, but is not limited to, the aerodynamic drag, the value of the signals received from the sensors, a predetermined variable value, and/or a user inputted constant parameter. The predetermined variable value may be, for example, the time interval that a timer signals the computer to recalculate the aerodynamic drag. The user may be permitted to input a value of a physical parameter when the physical parameter remains constant throughout a period of measurement. Examples of the constant physical parameter include but are not limited to the air pressure or the weight of the rider.

In embodiments of the invention, the aerodynamic drag from the remaining force caused by the weight of the rider when the vehicle is traveling on a slope and/or the forward acceleration of the rider-vehicle system is isolated. This may be achieved using an auxiliary sensor to measure the weight of the rider, the vehicle's angle of inclination relative to a horizontal plane, and/or the acceleration of the rider and vehicle. Alternatively, the values of any of these physical variables can be input by the user.

In embodiments of the invention, the product of drag coefficient and rider's front surface area is calculated. These embodiments can be achieved using the determined aerodynamic drag and other wind characteristics measured by the auxiliary sensor. The wind characteristics may comprise the wind speed relative to rider and vehicle, the ambient air temperature, the barometric pressure, the relative humidity, and/or the partial vapor pressure. If the frontal area of the rider is known, the coefficient of the drag can be determined as well.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

In the following detailed description, certain specific terminology will be utilized for the sake of clarity, and particular embodiments described, but it is to be understood that this is not intended to be limiting and should not be construed inasmuch as the invention is capable of taking many forms and variations within the scope of the appended claims.

BRIEF DESCRIPTION OF THE FIGURES

For more complete understanding of the present invention embodiments of the invention will now be described, by way of example only, with reference to the following illustrative figures in which: In the figures, like reference numbers refer to like elements or acts throughout.

Figure 1:
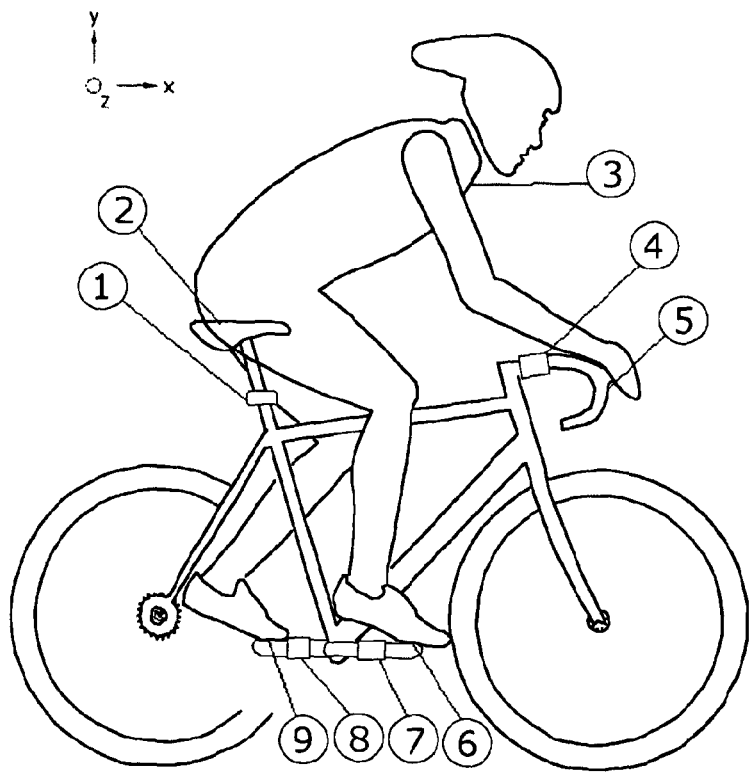
FIG. 1 shows a bicycle fitted with sensors near the 4 contact points between rider and bicycle.

Elements and acts in the figures are illustrated for simplicity and have not necessarily been rendered according to any particular sequence or embodiment.

DETAILED DESCRIPTION OF EMBODIMENTS OF THE INVENTION

This invention aims to disclose a system and methods of continuous aerodynamic drag monitoring of an exposed rider on a vehicle. The basic theory of physics behind this invention is that when a vehicle that exposes a rider travels through the air, drag forces exert a rearward force on the rider. The vehicle exerts an equal but opposite force on the rider to propel the body through the air. This force must be transferred to the rider through the body's limited points of contact with the vehicle. At least one force sensor is located at or near the one or more points of contact between the rider and the vehicle to measure a force of the vehicle on the rider. The measured force from the or each force sensor can then be processed to determine aerodynamic drag acting on the rider on the vehicle.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Take a bicycle as an example without limiting this invention as such. To actually measure the horizontal forces acting on a rider on a bicycle, various force sensors, for example strain gauges, or any feasible sensor known to those skilled in the relevant arts can be placed at or near the points of contacts. There are usually, but not necessarily, four points of contact on a bicycle one at the handlebar, one at the saddle or seat, and the rest on the pedals. In one embodiment, the handlebar sensor can be located on the steering assembly above the bicycle head tube, which comprises the handlebar, stem, or the steerer tube of the fork. The saddle sensor can be in the saddle or seat post. The pedal sensors are generally located at the pedals, crank arms, or the bottom bracket that connects the crank arms. However in some embodiments, pedal force vectors can alternatively be calculated with knowledge of power output and force sensors mounted in any place on the bicycle that can detect pedaling forces, or with a combination of pedal force sensors and prior knowledge of stereotypical force vector directions, such as in the clock diagram shown in FIG. 3. The total longitudinal force on the rider can be determined by summing the forces measured and calculated from the signals received from these sensors. Total longitudinal force=$F_H$+$F_S$+$F_P$, where $F_H$, $F_S$, and $F_P$ are the longitudinal forces at the handlebar, saddle, and pedals respectively.

There are forces other than the aerodynamic drag that may contribute to the total longitudinal force measured or calculated. Subtracting these forces from the total longitudinal force will result in a more accurate determination of the aerodynamic drag. For instance, when a bicycle travels on surfaces that are not level, a tilt sensor and knowledge of the weight of the rider can be used to isolate forces caused by gravity from forces of aerodynamic drag. Another example would be the forces caused by forward acceleration which may be determined by measurement or prior knowledge of the weight of the rider and the acceleration of the rider-vehicle system. Furthermore, knowledge of the wind speed the rider is traveling through and the density of air can be used to calculate the product of the frontal area of the rider and the coefficient of drag for the rider.

There are several types of sensors that can measure forces. In one application of the invention, foil strain gauges are used. Alternative sensors include but are not limited to Piezo electric, optical, any other strain or force measurement technology. The sensors can be mounted by any method known to anyone skilled in the relevant arts. For example, a sensor can be mounted by fixturing or held in place with epoxy.

The sensors can be calibrated, before first using this invention or on a regular basis to keep higher accuracy, in any process understood by those skilled in the relevant arts. A calibrating process, by non-limiting example, may apply a known load and record the magnitude of the signals.

The data gathered from the sensors may be stored and analyzed by a computer on the vehicle or by a remote computer. In one embodiment, the data can be analyzed in the microprocessor on the vehicle and displayed on a cyclocomputer. In another embodiment, additionally or alternatively the data is stored in an on-board memory for later download and analyzed by another computer. Real-time transmission to another computer can be an option, too.

FIG. 1 depicts a two-wheeled vehicle equipped for measuring longitudinal forces on rider 3. The measuring device can, for example, be made of sensors measuring force in the x direction at points 1, 4, 7, & 8. The point indicated at 1 is at the seat post, the point indicated at 4 is near the handlebar, and the points indicated at 7 and 8 are on the crank arms. The location of these sensors is important only in that they must be close enough to the points of contact between rider and equipment, identified as 2, 5, 6, and 9 in FIG. 1, to allow a force measurement that mainly consists of longitudinal forces acting on rider 3. The contact point indicated at 2 is on the saddle, the contact point indicated at 5 is at the handlebar and the contact points indicated at 6 and 9 are at the pedals.

Figure 2:
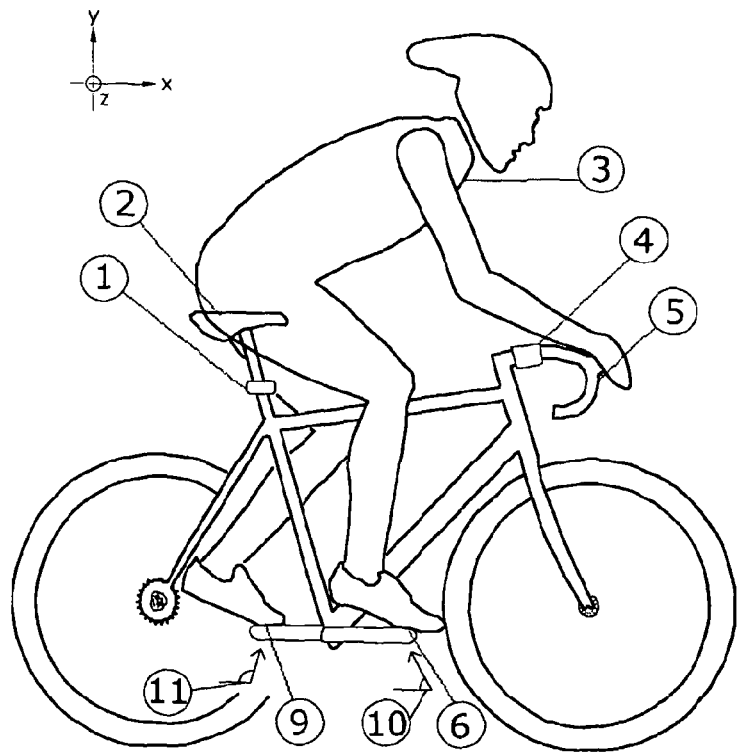
FIG. 2 shows a bicycle fitted with sensors at only 2 points of contacts, where measurement of forces in the y direction and knowledge of the direction of force vectors 10 and 11 allow for measurement of a majority of the aerodynamic drag forces on the cyclist.

FIG. 2 shows a further example of a method of measuring aerodynamic drag on a rider. Since the system shown here is in agreement with the example shown in FIG. 1, in the two figures identical reference symbols were used. In FIG. 2, in contrast to FIG. 1, no sensors measure forces near contact points 6 and 9. Rather, forces in the y direction taken at 1 and 4, for example, coupled with calibrated or other prior knowledge of the direction of the force vectors at 6 and 9, allow for measurement of a majority of the aerodynamic drag on rider 3.

Figure 3:
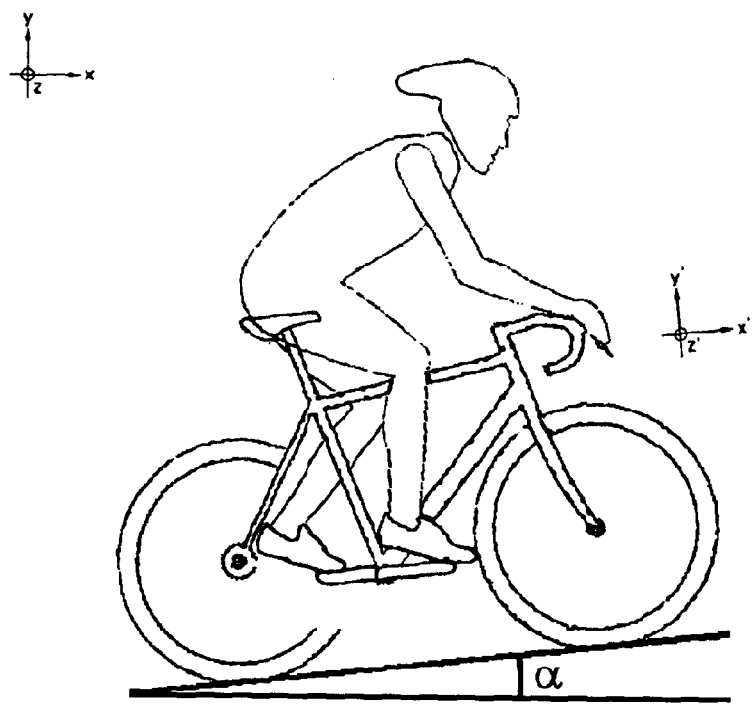
FIG. 3 shows a rider-bicycle system traveling on a slope.

FIG. 3 depicts a rider on a bicycle traveling on a slope. Because of the angle of the rider's direction of travel relative to the horizontal plane, the rider's weight creates a force vector on the x' direction which is measured by the sensors on the bicycle, consequently becoming part of the total longitudinal force. This force vector from the rider's weight, he, can be calculated from a general rotation matrix:

$$\begin{bmatrix} \cos(\alpha) & -\sin(\alpha) \\ \sin(\alpha) & \cos(\alpha) \end{bmatrix} \begin{bmatrix} F_X \\ F_Y \end{bmatrix} = \begin{bmatrix} F_{X'} \\ F_{Y'} \end{bmatrix}.$$

Fx=0 and Fy=rider's weight when the rider is traveling on a horizontal plane, and α is the angle measured by a tilt sensor.

Figure 4:
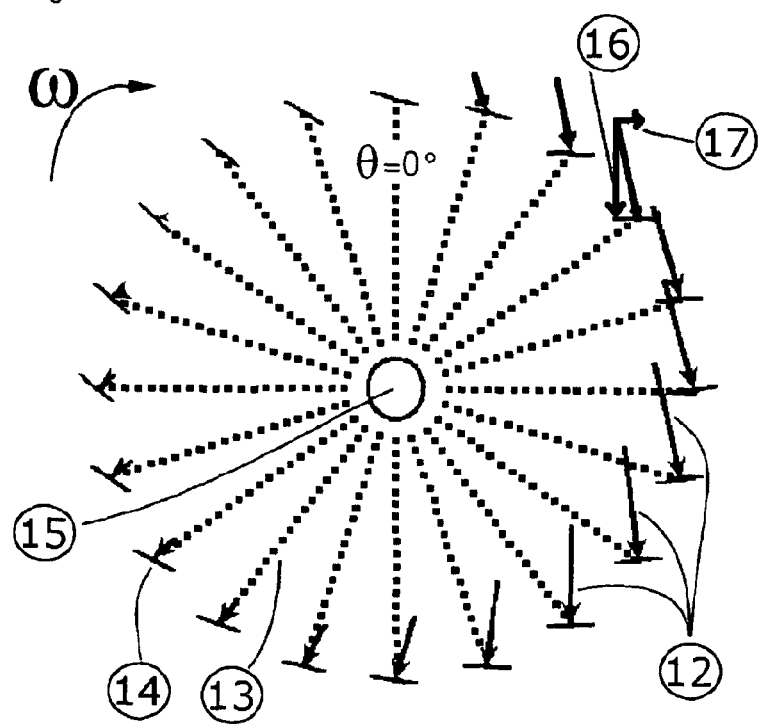
FIG. 4 is a force vector "clock" diagram depicting the stereotypical force vector at various positions around the crank cycle.

FIG. 4 is a "clock diagram" that is known in the art and popular in cycling literature. The crank arm 13, pedal 14, and the force vector from the cyclist 12 are shown in their correct geometric configuration for various positions of crank arm rotation (θ), rotating around crank axis 15. This clock diagram can be used to determine forces in the x direction, given forces in the y direction at any point during the pedal cycle.

U.S. Pat. No. 7,599,806 (B2) teaches a method to measure pedal forces. It reveals a clock diagram similar for both elite athletes and recreational cyclists. The clock diagram can be used to determine forces in the x direction, given forces in the y direction at any point during the pedal cycle on a bicycle.

The referenced patent discloses that when measuring the direction of force vector acting on a pedal during the crank arm's rotation, low statistical variance exists among subjects even though factors like athletic conditioning vary. Therefore, using a predefined table of the relationship between the direction of the force vector and the crank arm's position will yield to accurate results in calculating F_y force 17 when F_x force 16 is known.

Figure 5:
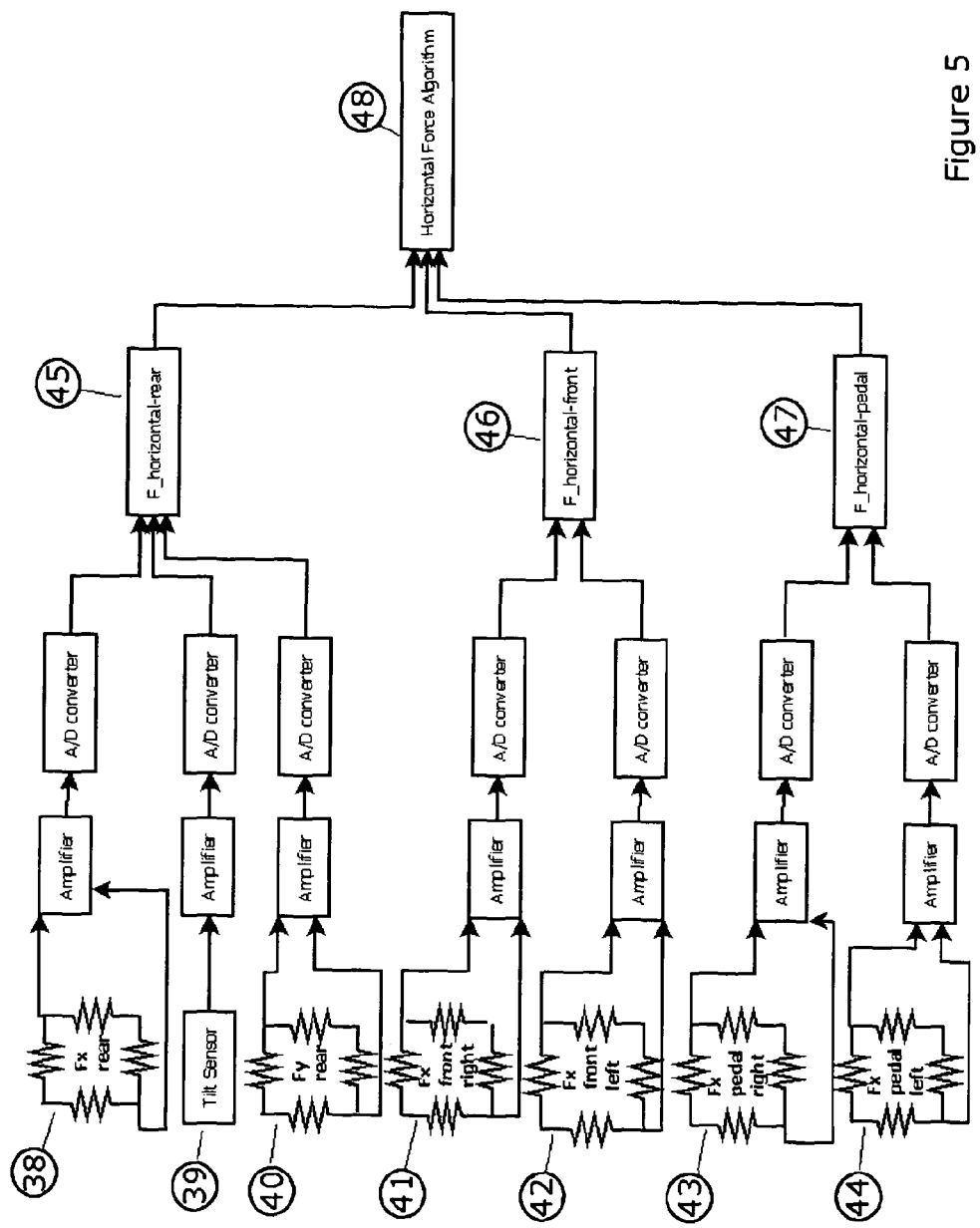
FIG. 5 is a diagram showing the collection and processing of sensor information to determine the total horizontal forces for a bicycle-mounted system where all points of contact between rider and bicycle have sensors.

FIG. 5 shows an arrangement for measuring longitudinal forces. In this example it is assumed that the bicycle travels over a substantially horizontal surface and the terms "longitudinal" and "horizontal" are used interchangeably—it has been explained above how the arrangement can be adapted to account for slope. The sensors are located at or near four contact points. Signals indicative of the measured force are sent by each sensor to a respective amplifier. These signals from the sensors are then amplified and converted to a digital format at respective analogue-to-digital (A/D) converters for easy manipulation by a microprocessor. Sensors 38 and 40, which respectively measure a longitudinal force and a force orthogonal to the ground may be subject to inaccurate readings due to flex in the bicycle seat post. If necessary or desirable this can be corrected by pairing them with a tilt sensor, as shown in FIG. 5 at 39, to make corrections for the angle of misalignment. Those skilled in the art will know this is easily accomplished in matrix form by use of the rotation matrix, $$\begin{bmatrix} \cos(\alpha) & -\sin(\alpha) \\ \sin(\alpha) & \cos(\alpha) \end{bmatrix} \begin{bmatrix} F_X \\ F_Y \end{bmatrix} = \begin{bmatrix} F_{X'} \\ F_{Y'} \end{bmatrix}.$$

The microprocessor receives the digital signals and determines the aerodynamic drag acting on the rider on the vehicle using the received signals using an algorithm. The algorithm is implemented by suitable computer program code (not shown) stored in a suitable storage medium (not shown) and which, when executed by the microprocessor processes the received signals to determine the aerodynamic drag on a rider. At the microprocessor, horizontal forces are determines at 45 using signals from the force sensors 38, 40 and the tilt sensor 39. Longitudinal handlebar forces from a handlebar force sensor in the form of a force sensor 41, 42 for each handhold are summed together at 46, as are pedal forces 47 from force sensors 43, 44 on each pedal. The sum of all horizontal forces is equal to the total external forces on the rider, which is calculated at 48.

The same process can also apply to measuring by any number of sensors placed at or near contact points between the rider and the vehicle—such process comprises receiving and processing signals from the sensors, correcting the reading(s) when any of the sensors is located on a flexible part and a tilt sensor is available to measure how much the flexible part leans, and summing all horizontal forces.

Figure 6:
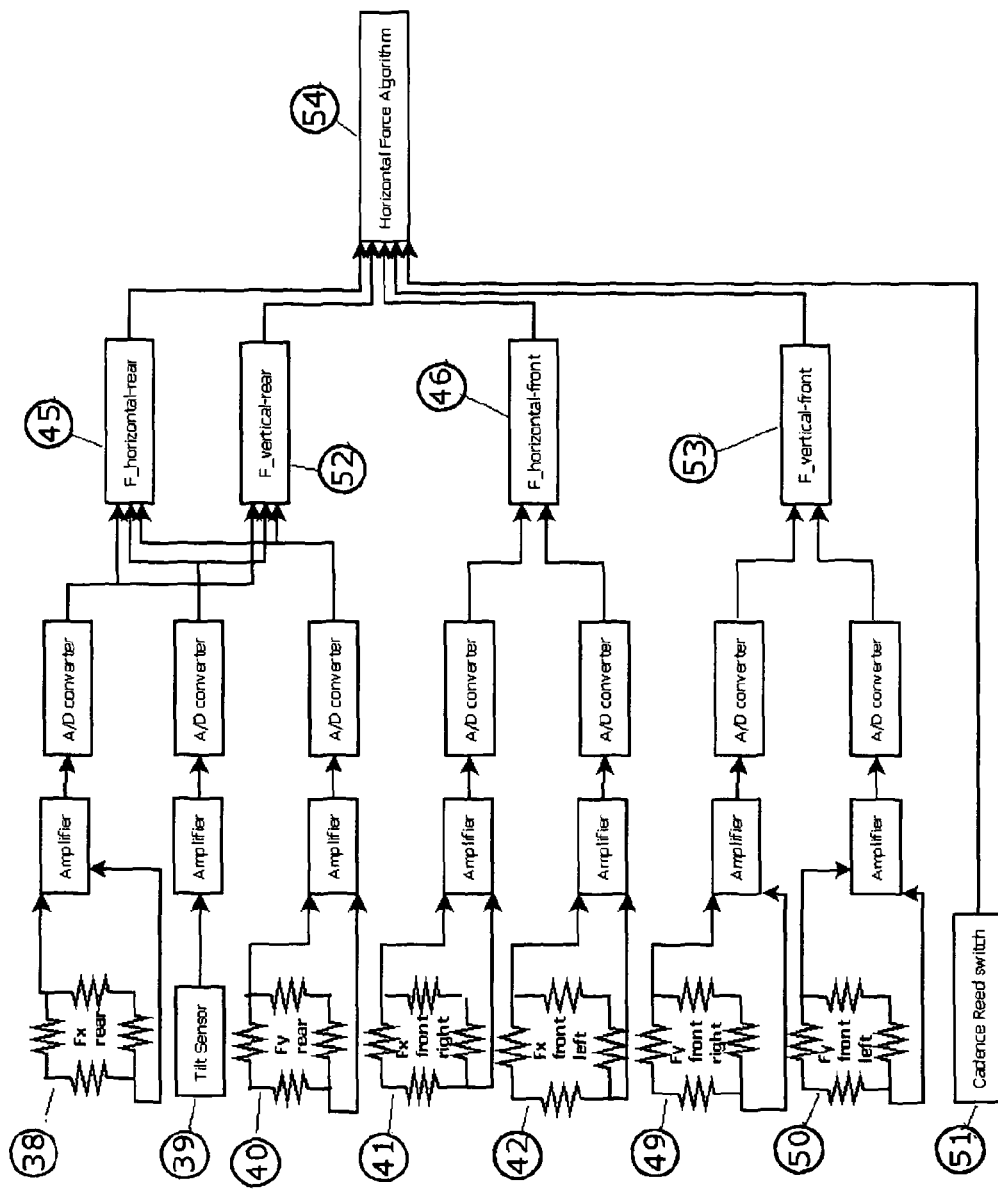
FIG. 6 is a diagram showing the collection and processing of sensor information to determine the total horizontal forces for a bicycle-mounted system where the pedal connections between rider and bicycle do not have sensors.

FIG. 6 shows another arrangement for measuring horizontal forces with force sensors at or near only the handlebars and seat post. Again, it is assumed that the bicycle is to travel over a substantially horizontal surface and so the terms "horizontal" and "longitudinal" are used interchangeably. The horizontal forces at the handlebar 45 and seat post 46 are calculated in the same manner as was described in FIG. 5. To determine the horizontal forces at pedals 6 and 9 in FIG. 2 it is necessary to know the total vertical force the rider exerts on the handlebar 53 and saddle 52 sensors when not pedaling, and the position of the crank arms at the time of measurement. Thus the vertical force at or near the saddle/seatpost is calculated at 52. Handlebar sensors in the form of a force sensor 49, 50 for each handhold measure the vertical force. Again signals from each force sensor 49, 50 indicative of the measured force are amplified at a respective amplifier, converted to a digital signal at an A/D converter, and provided to the microprocessor for summing. Taking the instantaneous sum of vertical forces at the handlebar and the seat post and subtracting them from the known total force yields the instantaneous vertical force being applied at the pedals. In one embodiment, the cranks can be assumed to move at a constant rotational velocity so that the position of the crank arm can be calculated by knowing the elapsed time since the crank arm last passed the cadence reed switch 51. Alternatively, crank position can be determined by analyzing the sinusoidal output of a force sensor sensing pedal forces. Peak pedal force occurs at the same point in every pedal rotation during seated pedaling and so can be used as a reliable indicator of crank position. Knowing the vertical force on the pedal, and the angular position of the crank arm it is possible to use the "dock diagram" in FIG. 4 to calculate the horizontal force at the pedals. The tables below demonstrate another set of mappings among the crank angle and the angles of relative pedal force vectors that can be used to determine the pedal force components.

| Angles of Pedal Force Vectors at Given Crank Angles | | | | | | | | | | |
|---|---|---|---|---|---|---|---|---|---|---|
| | crank angle | | | | | | | | | |
| | 0 | 18 | 36 | 54 | 72 | 90 | 108 | 126 | 144 | 162 |
| pedal force relative to crank tangential | 74 | 56 | 39 | 23 | 2 | 345 | 334 | 318 | 304 | 294 |
| pedal force relative to vertical | 344 | 344 | 345 | 347 | 344 | 345 | 352 | 354 | 358 | 6 |

-continued

Angles of Pedal Force Vectors at Given Crank Angles

| | crank angle | | | | | | | | | |
|---|---|---|---|---|---|---|---|---|---|---|
| | 180 | 198 | 216 | 234 | 252 | 270 | 288 | 306 | 324 | 342 |
| pedal force relative to crank tangential | 286 | 282 | 270 | 256 | 248 | 226 | 215 | 180 | 140 | 120 |
| pedal force relative to vertical | 16 | 30 | 36 | 40 | 50 | 46 | 53 | 36 | 14 | 12 |

Figure 7:
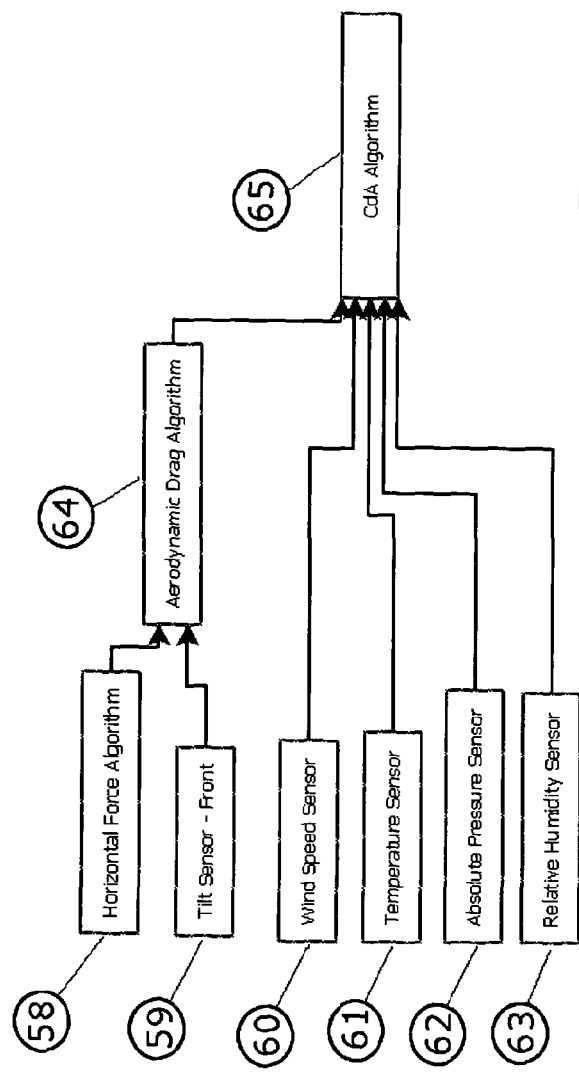
FIG. 7 is a diagram showing the collection of sensor information and the calculation of wind drag and the product of coefficient of drag and the frontal area of the rider.

FIG. 7 shows the calculation of aerodynamic drag and the product of the frontal area of the rider and the coefficient of drag on the rider. Horizontal force can be calculated as described above, for example in either way as described with reference to FIG. 5 and FIG. 6, or other ways, for example, using a power measurement system to measure pedal forces. If the rider is not traveling on a level surface, as in FIG. 3, the amount of force in the direction of travel that can be attributed to body weight can be calculated with prior knowledge of the rider's body weight, and a tilt sensor to monitor the angle of the bicycle in relation to the horizontal. The tilt sensor, indicated at 59, must be mounted on a stable (non-flexing) part of the bicycle such that it consistently reads the true direction of motion for the bicycle. The calculation is performed with a rotation matrix as described previously.

The relationship between an aerodynamic drag (Fd) 64 and coefficient of drag ($C_d$) 65 is well known to those skilled in the relevant arts. An example of this relationship is $Cd*A=2F_d/(\rho*V_W^2)$, where $\rho$ is the density of air, Vw is the wind speed the body is traveling through, and A is the frontal area of the body normal to the direction of motion. Wind speed may be measured using an anemometer 60 mounted in an area of undisturbed airflow. In one embodiment, the anemometer is mounted between the handlebars. Air density can be described as $\rho=P/R_d T$ for dry air, where P is absolute air pressure, $R_d$ is the universal gas constant for dry air and T is temperature in degrees Celsius. The absolute air pressure is determined using an absolute pressure sensor 62 and temperature is determined using a temperature sensor 61. However, air density also varies with humidity. To accommodate for this the equation is expanded to $\rho=P/(R_d*T)*(1-0.378*P_v/P)$ where $P_v$ is the partial vapor pressure. Partial vapor pressure can be calculated by using a relative humidity sensor 63. The relationship between relative humidity (RH) and partial vapor pressure is $P_v=RH*61.078^{(7.5T/(237.7+T))}$.

Each of sensors 59 to 60 is configured to provide a signal indicative of the measured variable to the microprocessor, by either wired or wireless transmission. In some embodiments, temperature sensor should not be located too close to the body. The wind speed sensor may be positioned in any location as long as an accurate measurement of wind speed could take place; this includes but is not limited to the handle bar or helmet.

It will be appreciated that to measure longitudinal force exerted by the vehicle on the rider in a longitudinal direction, the or each force sensor, the number of force sensors being appropriate for the relevant vehicle, must be arranged at or near the relevant contact points in a manner such that the longitudinal force of the vehicle on the rider can be determined. The longitudinal force may be measured directly. Alternatively, a force vector which includes a component of the longitudinal force can be measured. Provided that the force vector measured is not orthogonal to the longitudinal force, the longitudinal force can then be determined where the angle of measurement from the longitudinal direction is known. A vertical force, or force orthogonal to the surface over which the vehicle is moving where the vehicle is on a slope, can be similarly determined from a measured force vector, provided the measured force vector is not perpendicular to vertical/orthogonal to the surface over which the vehicle is moving.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of calculating under changing conditions in real-time aerodynamic drag acting on a rider on a vehicle comprising:
    (a) measuring, by at least one force sensor located at or near at least one point of contact between the rider and the vehicle, a force of the vehicle on the rider, and sending to a computer, by the at least one force sensor, a signal indicative of the measured force;
    (b) determining, by the computer, from the received signal, a total longitudinal force acting on the rider;
    (c) determining by the computer aerodynamic drag acting on the rider on the vehicle, separate from the aerodynamic drag acting on the vehicle, using at least the determined total longitudinal force; and
    (d) repeating steps (a), (b), and (c) under changing conditions.

2. The method of claim 1, further comprising receiving and displaying by a visual display information indicative of the determined aerodynamic drag.

3. The method of claim 1, further comprising processing by the computer the signal received from the at least one force sensor, and determining by the computer a value for each processed signal, wherein step (b) is performed using the value of the or each processed signal.

4. The method of claim 1, further comprising receiving by the computer at least one signal comprising information indicative of a value of at least one physical variable measured by an auxiliary sensor, wherein the determining in step (c) of the aerodynamic drag is performed using said information.

5. The method of claim 4, wherein the at least one physical variables is the vehicle's angle of inclination relative to a horizontal plane, wherein the determining in step (c) further comprises determining the aerodynamic drag using the angle and a value for the rider's weight.

6. The method of claim 4, further comprising calculating a product of drag coefficient and rider's front surface area from the determined aerodynamic drag and at least one physical variable measured by the auxiliary sensor.

7. The method of claim 1, wherein the at least one physical variable is an acceleration of the rider and vehicle, wherein the determining in step (c) further comprises determining the aerodynamic drag using a measured value for the acceleration.

8. The method of claim 1, wherein the vehicle is powered by at least one of: stored chemical, mechanical, or electrical energy, human propulsion and gravity.

9. The method of claim 1, wherein the vehicle is a bicycle with a seat, a handle bar and pedal crank arms, wherein, in step (a), one of the force sensors is a handlebar force sensor installed at or near the handle bar, another of the force sensors is a seat force sensor installed at or near the seat, and step (a) further comprises receiving a signal from a pedal force sensor.

10. The method of claim 9, wherein the pedal force sensor comprises at least one force sensor located at or near a pedal to measure force on the pedal, and wherein in step (a) the computer receives signals indicative of force measured by said at least one force sensors.

11. The method of claim 9, wherein the signals received from the seat force sensor and optionally the handlebar sensor include information indicative of a force of the vehicle in a direction in a vertical plane orthogonal to the direction of movement, and the pedal force sensor comprises at least one sensor for determining crank arm position, wherein the determining the aerodynamic drag on the rider includes determining a value for the longitudinal force of the pedals on the rider based on said information indicative of force in the orthogonal direction, data relating orthogonal pedal forces during the pedal cycle, and information on the crank arm position.

12. The method according to claim 1, wherein a physical parameter remains constant throughout a period of measurement, further comprising receiving a value for the constant physical parameter at an interface.

13. A method of calculating under changing conditions in real-time aerodynamic drag acting on a rider of a bicycle with a seat, a handle bar, and pedal crank arms, wherein at least one time-varying physical variable is measured, comprising:
(a) receiving by the computer signals from
    a first force sensor installed at or near the handle bar;
    a second force sensor installed at or near the seat; and
    an auxiliary sensor that measures the physical variable;
(b) processing by the computer the signals received from the first force sensor, the second force sensor, and the auxiliary sensor;
(c) determining by the computer a value for each processed signal;
(d) determining, by the computer, from the values for the processed signals, a total longitudinal force acting on the rider;
(e) determining by the computer the aerodynamic drag acting against the rider using at least the determined total longitudinal force; and
(e) repeating steps (a),(b),(c),(d) and (e) after a predetermined interval of time under changing conditions.

14. A system for calculating under changing conditions in real-time aerodynamic drag acting on a rider on a vehicle, comprising:
at least one force sensor, each force sensor being configured to be located at or near at least one point of contact between the rider and the vehicle and being configured to measure a force of the vehicle on the rider; and
a processor configured to:
receive signals from the at least one force sensor, the signals comprising information indicative of the measured force,
determine from the received signals a total longitudinal force acting on the rider and
determining aerodynamic drag acting on the rider on the vehicle using at least the determined total longitudinal force.

15. The system of claim 14, wherein the processor is further configured to send information indicative of the aerodynamic drag to a visual display.

16. The system of claim 14 further comprising an auxiliary sensor for location on the rider or at a point on the vehicle, for measuring at least one physical variable and for providing a signal indicative of the at least one measured physical variable to the processor;
wherein the processor is arranged to receive and process signals from the auxiliary sensor, assign a value to the signal, and calculate the aerodynamic drag using the values of the signals from the at least one force sensor and the auxiliary sensor.

17. The system of claim 16, further comprising calculating a product of drag coefficient and riders front surface area from the aerodynamic drag and at least one physical variable measured by the auxiliary sensor.

18. The system of claim 16, wherein the at least one physical variable is at least one of:
a wind speed relative to rider and vehicle;
an ambient air temperature;
a barometric pressure;
a relative humidity; and
a partial vapor pressure.

19. The system of claim 14, wherein the processor is further configured to receive at least one signal comprising information indicative of an acceleration of the rider and vehicle, and wherein the processor is configured to determine the aerodynamic drag using a measured value for the acceleration.

20. The system of claim 14, wherein the vehicle is powered by at least one of: stored chemical, mechanical, or electrical energy, human propulsion and gravity.

21. The system of claim 14, wherein the vehicle is a bicycle with a seat, a handle bar and pedal crank arms, wherein a one of the force sensors is a handlebar force sensor installed at or near the handle bar, another of the force sensors is a seat force sensor installed at or near the seat, and further comprising a pedal force system arranged to send signals to the processor.

22. The system of claim 21, wherein the pedal force system comprises at least one force sensor located at or near a pedal for measuring force on the pedal, and wherein the processor is configured to receive signals indicative of force measured by said at least one force sensors.

23. The system of claim 21, wherein the signals received from the seat force sensor and optionally the handlebar sensor include information indicative of a force of the vehicle in a direction in a vertical plane orthogonal to the direction of movement, and the pedal force system comprises at least one sensor for determining crank arm position, wherein the determining the aerodynamic drag on the rider includes determining a value for the longitudinal force of the pedals on the rider based on said information indicative of a force in the orthogonal direction, data relating orthogonal pedal forces during the pedal cycle, and information on the crank arm position.

24. The system of claim 14, wherein a physical parameter remains constant throughout a period of measurement, further comprising an interaction device to receive an input value for the constant physical parameters.

* * * * *